W. NESS.
COMPRESSED AIR SPRAYER.
APPLICATION FILED JUNE 25, 1913.
1,189,165. Patented June 27, 1916.
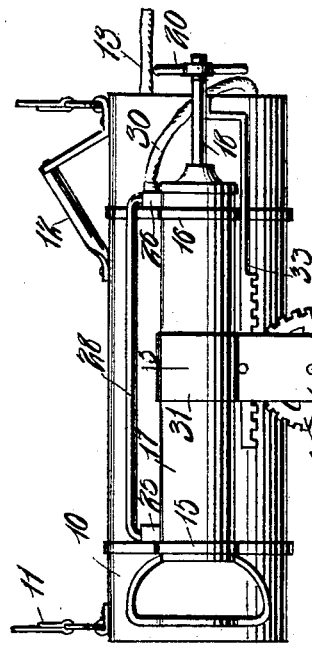
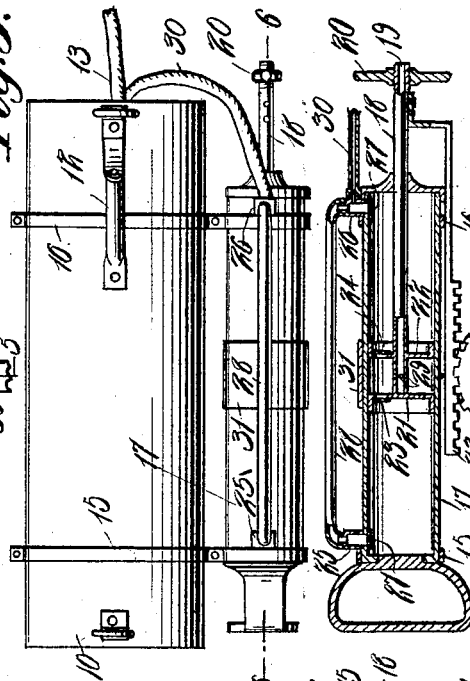
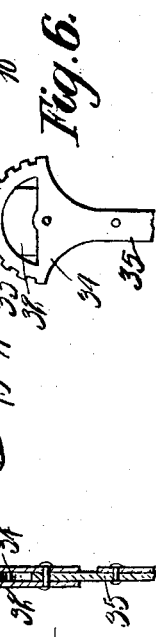
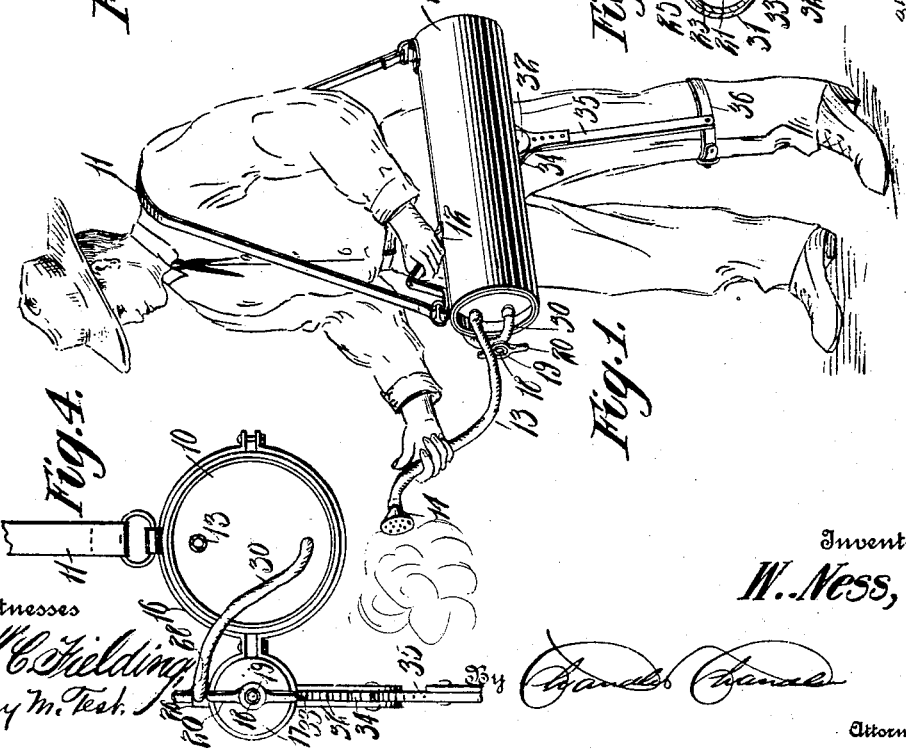
Inventor
W. Ness,

UNITED STATES PATENT OFFICE.

WILLIAM NESS, OF SPRING GROVE, PENNSYLVANIA.

COMPRESSED-AIR SPRAYER.

1,189,165.  Specification of Letters Patent. Patented June 27, 1916.

Application filed June 25, 1913. Serial No. 775,783.

*To all whom it may concern:*

Be it known that I, WILLIAM NESS, a citizen of the United States, residing at Spring Grove, in the county of York, State of Pennsylvania, have invented certain new and useful Improvements in Compressed-Air Sprayers; and I do hereby declare the following to be a full, clear, and exact description of the invention, such as will enable others skilled in the art to which it appertains to make and use the same.

This invention relates to improvements in plant spraying devices, and particularly to devices of this character which are operated with compressed air.

The principal object of the invention is to provide a double-acting air pump which is actuated by the movements of the operator as he walks to force air into the tank.

Other objects and advantages reside in the peculiar construction and arrangement of the various parts, to accomplish the above result.

In the drawings: Figure 1 is a perspective view of the device in operation. Fig. 2 is a side elevation of the device. Fig. 3 is a top plan view. Fig. 4 is an end view. Fig. 5 is a vertical transverse sectional view on the line 5—5 of Fig. 2, and Fig. 6 is a vertical longitudinal sectional view on the line 6—6 of Fig. 3.

Referring particularly to the accompanying drawings, 10 represents a tank of suitable size and material which is adapted for containing an insecticide or parasite destroying fluid, and which is also provided with a strap 11 for suspending the same from the shoulder of the operator. Carried by the forward upper end of the tank is a suitable handle 12 which is so arranged as to be conveniently grasped by the operator to hold the same steady for the operation of the pump which will be described later. In the forward end of the tank is carried a hose 13 which is provided on the outer end with a suitable spraying nozzle 14, this nozzle being arranged to be held and directed by the other hand of the operator.

Secured to one side of the tank by means of the clips 15 and 16 is the cylinder 17 of a double-acting pump. This pump has the hollow piston rod 18 extending longitudinally therethrough, the outer end of which is open as indicated at 19, a suitable handle 20 being carried thereby to operate the pump by hand if desired. On the inner end of the rod 18 are arranged the two pistons 21 and 22, the former of which has a check valve 23 which opens outwardly, and the piston 22 with a check valve 24 opening in the direction away from the other piston. The cylinder 17 of the pump is disposed longitudinally on the side of the tank, and mounted on the upper side of the cylinder and near the ends thereof are the blocks 25 and 26, each of which is provided with a check valve 27, these blocks being connected by a pipe 28. Formed in the hollow piston rod between the pistons 21 and 22 are openings 29 through which air passes by means of the check valves to the ends of the cylinder from the rod 18. Connected to the block 26 at one end, and at its other end to the end of the tank 10 is a short length of hose or pipe 30, this being the means for conveying air from the pump into the interior of the tank.

Embracing the central portion of the pump cylinder is a clip 31, which is provided with depending spaced ears 32, these ears providing a guiding space for a longitudinally extending rack bar 33, one end of which is rigidly connected to the outer end of the hollow piston rod 18. Pivotally mounted in the lower ends of the ears 32 is the toothed segment 34 of the operating lever 35 of the pump. The teeth of the rack segment mesh with the teeth of the rack 33, and when the said lever 35 is rocked back and forth on its pivot, the rack bar 33 will be moved back and forth longitudinally, carrying with it the piston rod 18, and causing the air to be forced first through the check valve 27 of block 25 and pipe 28 into the tank through the pipe 30, and then through the check valve of the block 26 directly through pipe 30 into the tank. The lever 35 as clearly shown in Fig. 1 extends down the outside of the leg of the operator, and on its lower end carries a strap 36 which is arranged to be secured about the leg to hold the lever thereto. It will thus be seen that as the operator walks, the lever 35 will move with the leg of the operator, and cause the reciprocation of the piston of the pump, and the consequent forcing of air into the tank. This drives the liquid in a spray through the pipe 13 and nozzle 14, which nozzle is directed by the operator onto the plants.

From the foregoing, it will readily be seen that as the operator walks, the pump is actuated by the leg of the operator and a constant pressure of air maintained in the tank, the operator at the same time holding the tank steady with one hand while he directs the nozzle at the plants with the other hand. If it is desired to operate the device by hand, as for instance to force the initial pressure into the tank, the same may be operated either by means of the handle 20 or by rocking the lever 35.

I claim:

A manually operated spraying device comprising a tank having a shoulder strap attached at its ends to the ends of the tank whereby the tank may be suspended transversely of the hip of the user, a handle carried upon the tank adjacent the shoulder strap, an air compressing pump carried by the tank and communicating therewith, an operating lever for the pump positioned to depend alongside the leg of the operator, and means at the extremity of the lever for connecting it with the leg of the operator whereby the lever will be reciprocated through movement of the leg of the operator.

In testimony whereof, I affix my signature, in the presence of two witnesses.

WILLIAM NESS.

Witnesses:
A. D. WENTZ,
H. F. MALEALEY.

Copies of this patent may be obtained for five cents each, by addressing the "Commissioner of Patents, Washington, D. C."